United States Patent
Duplys

(10) Patent No.: US 12,499,242 B2
(45) Date of Patent: Dec. 16, 2025

(54) METHOD FOR ASCERTAINING A RELEVANCE OF SECURITY-RELEVANT VULNERABILITIES OF A PRODUCT

(71) Applicant: Robert Bosch GmbH, Stuttgart (DE)

(72) Inventor: Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 113 days.

(21) Appl. No.: 18/542,939

(22) Filed: Dec. 18, 2023

(65) Prior Publication Data
US 2024/0232384 A1 Jul. 11, 2024

(30) Foreign Application Priority Data
Jan. 10, 2023 (DE) ............ 10 2023 200 113.6

(51) Int. Cl.
G06F 21/57 (2013.01)
G06F 16/334 (2025.01)

(52) U.S. Cl.
CPC ........ G06F 21/577 (2013.01); G06F 16/3344 (2019.01); *G06F 2221/033* (2013.01)

(58) Field of Classification Search
CPC .. G06F 21/577; G06F 21/552; G06F 21/6218; G06F 2221/033; H04L 63/1433
See application file for complete search history.

(56) References Cited

U.S. PATENT DOCUMENTS

| | | | | |
|---|---|---|---|---|
| 9,749,349 | B1* | 8/2017 | Czarny | H04L 63/1425 |
| 10,185,832 | B2* | 1/2019 | Cam | G06N 7/01 |
| 10,621,360 | B2* | 4/2020 | Holz | G06F 21/577 |
| 10,713,364 | B2* | 7/2020 | Abadi | G06F 16/9024 |
| 10,762,214 | B1* | 9/2020 | Martin | G06F 16/245 |
| 10,936,750 | B2* | 3/2021 | Gkoulalas-Divanis | G06F 21/6254 |
| 11,218,503 | B2* | 1/2022 | Mullin | H04L 63/1433 |
| 11,481,500 | B2* | 10/2022 | Song | G06F 16/951 |
| 11,599,645 | B2* | 3/2023 | Waplington | G06F 21/54 |
| 11,632,428 | B2* | 4/2023 | Tikhomirov | H04L 67/12 709/220 |

OTHER PUBLICATIONS

Sarkar, "Text Analytics With Python: a Practitioner's Guide To Natural Language Processing," Apress, 2019, pp. 1-674.

* cited by examiner

Primary Examiner — Hosuk Song
(74) Attorney, Agent, or Firm — NORTON ROSE FULBRIGHT US LLP

(57) ABSTRACT

A method for ascertaining a relevance of security-relevant vulnerabilities of a product. The method includes the following steps which are carried out automatically: providing a terms specification which includes terms for specifying the vulnerabilities; providing a product profile of the product, which specifies the product on the basis of the terms in the terms specification; providing at least one vulnerability profile for the particular vulnerability, which specifies the vulnerability on the basis of the terms in the terms specification; ascertaining the relevance of the particular vulnerability for the product on the basis of a processing of the product profile and of the vulnerability profile.

11 Claims, 3 Drawing Sheets

METHOD FOR ASCERTAINING A RELEVANCE OF SECURITY-RELEVANT VULNERABILITIES OF A PRODUCT

CROSS REFERENCE

The present application claims the benefit under 35 U.S.C. § 119 of German Patent Application No. DE 10 2023 200 113.6 filed on Jan. 10, 2023, which is expressly incorporated herein by reference in its entirety.

FIELD

The present invention relates to a method for ascertaining a relevance of security-relevant vulnerabilities of a product. The present invention also relates to a computer program and to a device for this purpose.

BACKGROUND INFORMATION

Conventionally, security-relevant products are checked during their development phase for known vulnerabilities. This is often done by comparing a so-called "vulnerability database", that is to say a vulnerability database such as the NVD (National Vulnerability Database) or a similar database, with a software bill of materials (SBOM) in which the software components used in the corresponding product are listed. This check for known vulnerabilities is very desirable from a security perspective and often results in a long list of known vulnerabilities that are contained in the vulnerability database. However, often it is not clear which of these reported vulnerabilities are actually relevant for the specific product. For example, the NVD lists approximately 6000 known security holes for Linux Kernel 4.14. However, each of these defects is only relevant for a specific product when the corresponding kernel function is actually being used and when the defect-given the specifications of the product and its software configuration—can actually be exploited in practice.

SUMMARY

The present invention is directed to a method for ascertaining a relevance of security-relevant vulnerabilities of a product, a computer program, and a device. Features and details of the present invention will become apparent from the disclosure herein. Here, features and details which are described in connection with the method according to the present invention also apply, of course, in connection with the computer program according to the present invention and the device according to the present invention, and vice versa in each case, so that, with regard to the disclosure, individual aspects of the present invention always refer or can refer to one another.

The present invention is, in particular, a method for ascertaining a relevance of security-relevant vulnerabilities, preferably software vulnerabilities, of a product, preferably of a software product, in order to perform an automatic check of the product in this way. The product can have software and/or hardware components. The vulnerabilities can be information-technology-related vulnerabilities of the software components, but possibly also of the hardware components. According to an example embodiment of the present invention, the method can comprise the following steps, which can be carried out at least in some cases repeatedly and/or successively and/or automatically:

providing a terms specification, preferably a digital dictionary, which comprises terms for specifying the vulnerabilities (and in particular also generally security-relevant vulnerabilities regardless of the specific product), providing a product profile of the product which specifies the product on the basis of the terms in the terms specification, preferably using the terms in the terms specification, preferably on the basis of an SBOM or the like, providing at least one vulnerability profile for the particular vulnerability, preferably for each of the vulnerabilities, wherein the particular vulnerability profile specifies the particular vulnerability on the basis of the terms in the terms specification, preferably using the terms in the terms specification, and preferably using the same terms which were also used to provide the product profile, ascertaining the relevance of the particular vulnerability, preferably of each of the vulnerabilities, for the product on the basis of a processing of the product profile and of the vulnerability profile (for the particular vulnerability).

The present invention thus has an advantage that the relevant vulnerabilities for a specific product can be ascertained automatically and reliably. Most software vulnerabilities can be exploited only under certain conditions. Even when the vulnerable version of a software component is used in the specific product, it is therefore unclear whether the vulnerability can actually be exploited. This often depends on the fact that a standard SBOM does not contain any information about whether these specific conditions are present in a product (in the following the presence of these conditions is also referred to in particular as an attack possibility). Consequently, checking a product on the basis of a database comprising known vulnerabilities results in a large number of false alarms, which have to be removed manually. This is accompanied by a great deal of effort in checking such products for defects. It can therefore be an advantage of the present invention that, in the case in particular of SBOM-based product checks against known vulnerability databases, false-positive results can be automatically eliminated, or at least their number reduced, on the basis of the ascertained relevance.

According to an example embodiment of the present invention, the product profile and/or the particular vulnerability profile can, for example, be provided on the basis of a vulnerability report and also of an SBOM for a specific product and possibly of the source code for the specific product. It can then be determined automatically from a database such as the NVD which of the known vulnerabilities are actually relevant for this product. A relevance for the product will in particular be the case when the specific vulnerable function of a library or a specific vulnerable feature of the Linux kernel is actually used in the source code of this product.

Advantageously, it can be provided according to an example embodiment of the present invention that providing the terms specification comprises the following steps:

ascertaining a, preferably textual, vulnerability description of the particular vulnerability from at least one vulnerability specification, preferably from a public database of known vulnerabilities such as the NVD, wherein preferably the vulnerability description specifies at least one attack possibility according to the vulnerability, wherein preferably the at least one attack possibility indicates at least one condition under which an exploitation of the vulnerability is possible, determining the terms in the terms specification on the basis of the vulnerability description, preferably by language processing, preferably by a natural language processing technique, in which particularly preferably the terms are extracted from the vulnerability description.

This makes it possible for the terms specification to be structured as a dictionary having such terms as are used in a vulnerability specification for the description of vulnerabilities. The at least one vulnerability specification comprises, for example, publicly accessible databases in which the vulnerabilities are described with regard to attack possibilities. For example, in the vulnerability description, the vulnerabilities are described linguistically with regard to the technical conditions and/or software components which must be present for an exploitation of the vulnerabilities. The vulnerability description can in this case comprise the description by a natural language, in particular in the sense of NLP (natural language processing). For this purpose, the vulnerability description can use the terms in the terms specification.

It can be advantageous if, within the scope of the present invention, the provision of the product profile comprises the following step:

defining a product embedding, wherein for this purpose the terms in the terms specification are marked as regards their relevance for the product in order to describe the product by the marked terms, preferably by comparing the terms with a preferably textual product specification, wherein the product specification specifies the product with regard to at least one software component of the product.

The terms can, for example, then be marked as relevant for the product if they occur in the product specification. Otherwise, the terms might possibly be marked as non-relevant. The product embedding can then comprise these markings. It is possible for the product specification to describe the product using the terms in the terms specification. The product specification can, for example, include a mention of the software components of the product and/or of further technical details of the software components. It is possible for the product specification to describe the product by a natural language, in particular in the sense of NLP. This has the advantage that a description of the product that may already be present and provided for interpretation by individuals can be used for automatically checking the product.

Furthermore, according to an example embodiment of the present invention, it is possible for the provision of the vulnerability profile to comprise the following steps:

ascertaining a, preferably textual, vulnerability description of the, and preferably a current, security-relevant vulnerability from a vulnerability specification, preferably from a public database such as the NVD, wherein preferably the vulnerability description specifies at least one attack possibility according to the current vulnerability, wherein preferably the at least one attack possibility indicates at least one condition under which an exploitation of the current vulnerability is possible, defining a vulnerability embedding, wherein for this purpose the terms in the terms specification are marked as regards their relevance for the current vulnerability in order to describe the current vulnerability by the marked terms, preferably by comparing the terms with the ascertained vulnerability description.

The terms can, for example, then be marked as relevant for the vulnerability if they occur in the vulnerability description. Otherwise, the terms might possibly be marked as non-relevant. The vulnerability embedding can then comprise these markings. It is possible for the vulnerability specification to describe the vulnerability using the terms in the terms specification. The vulnerability specification can comprise, for example, a mention of software components and/or of further technical details of the software components. It is possible for the vulnerability specification to describe the vulnerability by means of a natural language, in particular in the sense of NLP. This has the advantage that a description of the product that may already be present and provided for interpretation by individuals can be used for automatically checking the product or for ascertaining relevance. The current vulnerability can in this case be a vulnerability which has currently, i.e., at the time of checking or ascertaining the relevance, been retrieved from the vulnerability specification. This may be related to the vulnerability specification being repeatedly updated in order to describe new vulnerabilities.

In addition, within the scope of the present invention, it can be advantageous that ascertaining the relevance comprises the following steps which are preferably carried out for each of the vulnerabilities:

ascertaining a similarity of the product profile, preferably of the product embedding, to the vulnerability profile for the particular vulnerability, preferably to the vulnerability embedding, preferably by calculating a distance, particularly preferably the Hamming distance, and/or on the basis of processing in the form of language processing, defining the relevance of the particular vulnerability on the basis of the ascertained similarity.

In other words, in order to ascertain the relevance, it is possible to compare to what extent the product profile and the particular vulnerability profile match (linguistically). In this way, on the basis of the associated vulnerability profile the relevance of this vulnerability can be ascertained for each of the vulnerabilities.

According to a further advantage, it can be provided according to an example embodiment of the present invention for the provision of the product profile to comprise the following step:

defining query terms on the basis of the terms in the terms specification, wherein the query terms specify the product.

The query terms can be provided for carrying out a query of the vulnerability description of the particular vulnerability in order to obtain a summary based on the query terms. For example, the summary can be specific for a frequency of the query terms in the vulnerability description. The query terms can, for example, be defined using the terms which are provided in the product specification and/or in the product embedding.

Furthermore, according to an example embodiment of the present invention, the provision of the vulnerability profile can comprise the following step which is carried out for the particular vulnerability, and preferably carried out for each of the vulnerabilities: ascertaining a query-based summary of a vulnerability description of the particular vulnerability on the basis of the defined query terms, preferably in order to filter the vulnerability description according to the query terms.

Ascertaining the relevance can in this case comprise the following step: defining the relevance on the basis of the ascertained query-based summary, preferably on the basis of a number and/or frequency of the query terms that occur in the vulnerability description. This makes possible a reliable ascertainment of the relevance.

The ascertained relevance can, for example, indicate whether the vulnerability in the specific product can be exploited. The relevance can, for example, have a classification. Furthermore, it is possible within the scope of the present invention that providing the vulnerability profile and ascertaining the relevance are carried out for a plurality of vulnerabilities, wherein the vulnerabilities are output on the basis of their ascertained relevance. This makes possible a reliable evaluation of security for the product.

Furthermore, it is possible that the product is intended for controlling a machine, preferably a vehicle, such as a motor vehicle and/or an autonomous vehicle, and/or a robot. In this case, according to an example embodiment of the present invention, the steps of the method can be carried out automatically repeatedly, preferably by a cloud service, in particular for monitoring the information security of the product during operation of the machine. The vehicle can, for example, be controlled automatically, for example by an autonomous driving function and/or a driver assistance system which is at least partially provided by the product.

The present invention also relates to a computer program, in particular a computer program product, comprising instructions which, when the computer program is executed by a computer, cause the computer to carry out the method according to the present invention. The computer program according to the present invention thus brings with it the same advantages as have been described in detail with reference to a method according to the present invention.

The present invention also relates to a device for data processing that is configured to carry out the method according to the present invention. For example, a computer which executes the computer program according to the present invention can be provided as the device. The computer can have at least one processor for executing the computer program. A non-volatile data memory can also be provided, in which the computer program is stored and from which the computer program can be read by the processor for execution.

The present invention can also relate to a computer-readable storage medium which comprises the computer program according to the present invention. The storage medium is designed, for example, as a data store such as a hard drive and/or a non-volatile memory and/or a memory card. The storage medium can be integrated into the computer, for example.

Furthermore, the method according to the present invention can also be carried out as a computer-implemented method.

Further advantages, features and details of the present invention will become apparent from the following description, in which exemplary embodiments of the present invention are described in detail with reference to the figures. The features mentioned in the disclosure herein can be essential to the present invention in each case individually or in any combination.

DETAILED DESCRIPTION OF EXAMPLE EMBODIMENTS

In the following figures, identical reference signs are also used for the same technical features of different embodiments.

Figure 1:
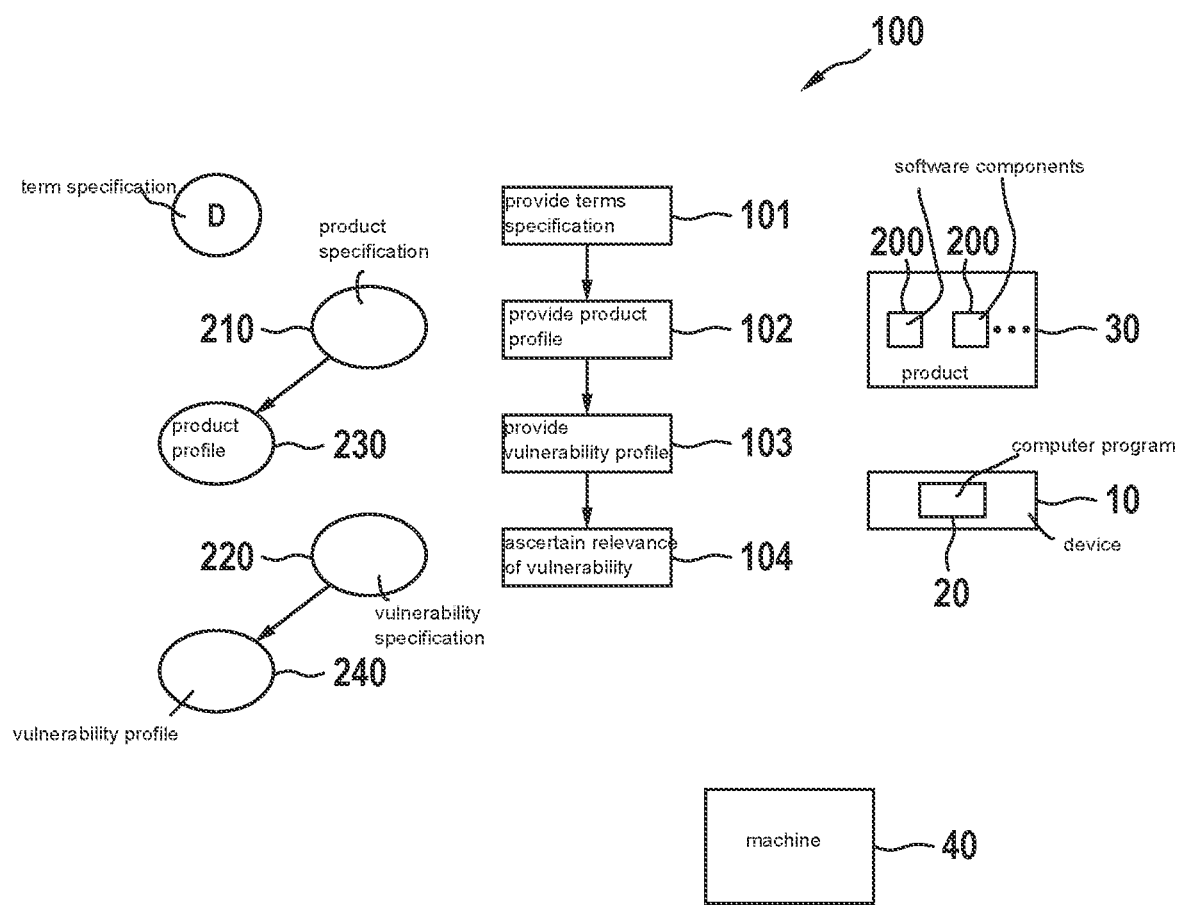
FIG. 1 shows a schematic visualization of a method, a device and a computer program according to exemplary embodiments of the present invention.

FIG. 1 shows a method 100 for ascertaining a relevance of security-relevant vulnerabilities of a product 30 according to exemplary embodiments of the present invention. According to a first method step 101, the method 100 comprises providing a terms specification D which comprises terms for specifying the vulnerabilities. In other words, the terms specification D can be regarded as a dictionary which comprises a collection of a plurality of terms which can be used to describe the vulnerabilities and possibly their attack possibilities. The attack possibilities can, for example, specify certain versions of software components 200 which must be provided as a condition in a product 30 so that a vulnerability can be exploited by an attacker and can cause damage. The attack possibility may therefore possibly also be referred to as a condition for exploiting a vulnerability.

Furthermore, according to a second method step 102, the method 100 comprises providing a product profile 230 of the product 30 which can specify the product 30 on the basis of the terms in the terms specification D. In other words, the product profile 230 can use the terms in the terms specification D in order to describe the software components 200 of the product 30 and/or the attack possibilities that are specifically present in the product 30. This can be, for example, a list of software components 200. However, the product profile 230 advantageously comprises a marking of the terms in the terms specification D according to their appearance in a product specification 210. The product specification 210 is, for example, a technical specification of the product 30 in text form for use by a user and possibly in natural language.

In addition, a third method step 103 is provided in which a vulnerability profile 240 for the particular vulnerability is provided. The particular vulnerability profile 240 can in this case specify the particular vulnerability on the basis of the terms in the terms specification D. Here too, it is possible that the vulnerability profile 240 comprises a marking of the terms in the terms specification D corresponding to their occurrence in a vulnerability specification 220. The vulnerability specification 220 can comprise a technical specification of the particular vulnerability in text form for use by a user and possibly in natural language.

According to a fourth method step 104, the relevance of the particular vulnerability for the product 30 is ascertained on the basis of a processing of the product profile 230 and of the vulnerability profile 240, preferably fully automatically.

In addition, FIG. 1 shows a computer program 20 for carrying out the method 100 and a device 10 for carrying out the method 100. It is also shown that the product 30 can be provided for controlling a machine 40, preferably a vehicle 40 and/or a robot 40. It is also shown that the product 30 can have one or more software components 200, which can each provide an attack possibility for exploiting a particular vulnerability. In this case, it can be an application purpose of the method 100 that the relevance of known vulnerabilities is evaluated with regard to the attack possibilities provided by the software components 200.

In order to obtain the terms specification D, it can first be provided that a vulnerability description of the particular vulnerability is ascertained from at least one vulnerability specification 220. The vulnerability description can comprise a technical description of the conditions under which the vulnerability can be exploited. These conditions can, for example, comprise the presence of attack possibilities due to the software components 200.

Figure 2:
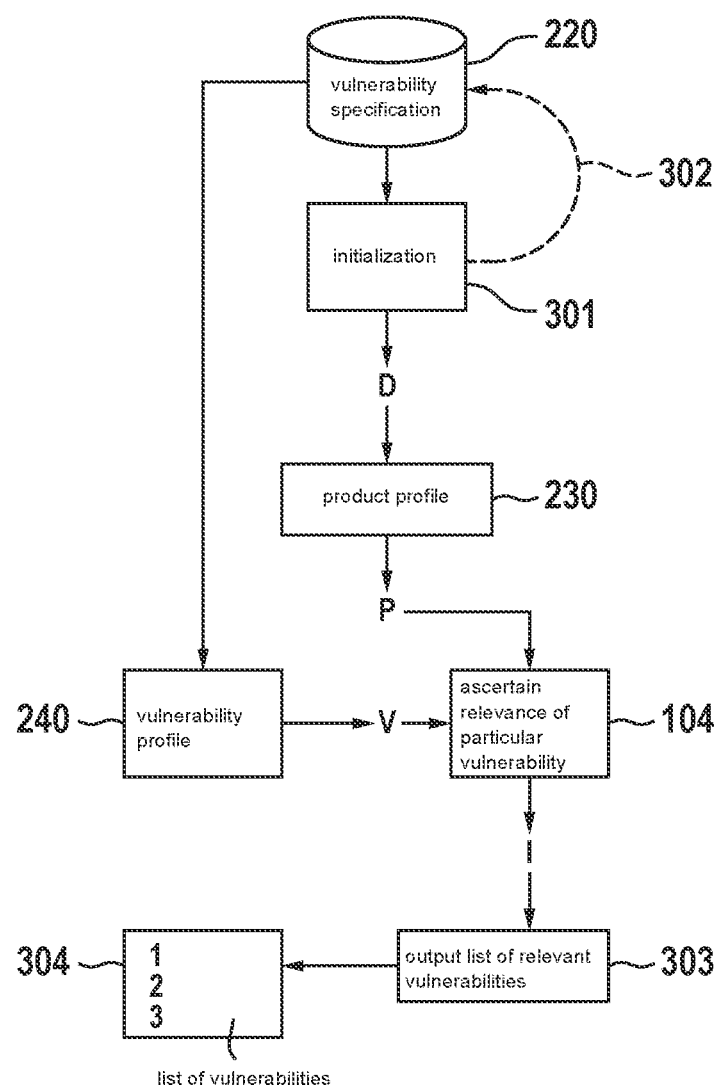
FIG. 2 shows a schematic representation of a further embodiment variant of the present invention.
Figure 3:
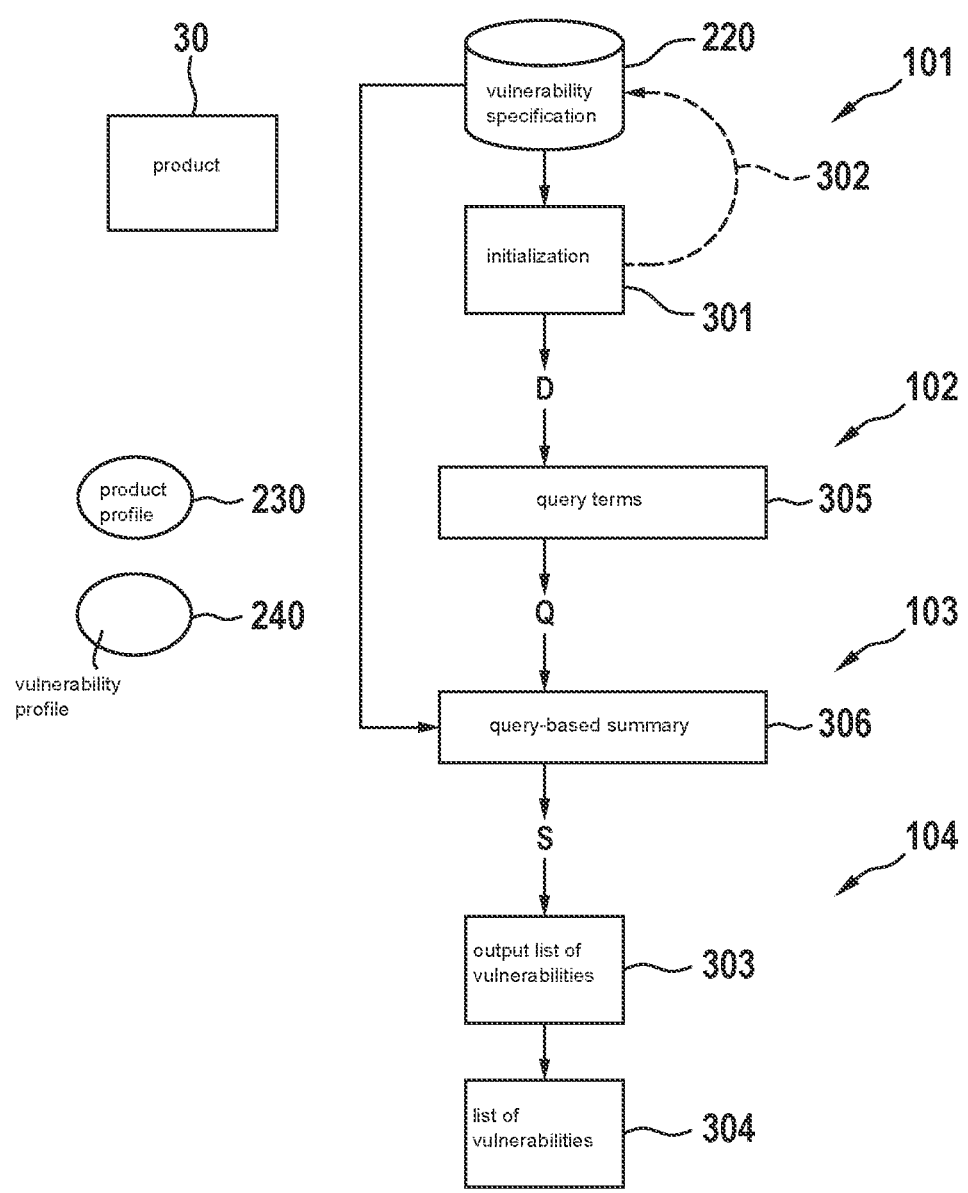
FIG. 3 shows a schematic representation of a further embodiment variant of the present invention.

In FIGS. 2 and 3, further details of exemplary embodiments of the present invention are shown. In particular, it is an underlying concept that an analysis of the vulnerability descriptions is carried out using natural language processing (NLP for short). The so-called text summary of the NLP can be used here. As is described in "Sarkar, D. (2019). Text Analytics with Python: a Practitioner's Guide to Natural Language Processing (pp. 1-674). Bangalore: Apress", in the case of the text summary composed of a body of text documents-which can be a collection of texts, paragraphs or sentences-a summary that contains the most important points in the text documents or collection can be created. A so-called query-based summary provides text summaries that are based on specific text queries. That is to say, query terms, such as keywords and phrases, that are relevant to these specific queries are extracted.

Another basic idea according to embodiments of the present invention is that a (query-based) text summary can be applied to individual vulnerability descriptions. This compacted information can then be used to estimate the probability of a certain vulnerability being relevant for the product 30 in question.

In the exemplary embodiment according to FIG. 3, following an initialization step 301, for example, the provision 102 of the product profile 230, can comprise a definition of such query terms 305 on the basis of the terms in the terms specification D, wherein the query terms specify the product 30. Furthermore, the provision 103 of the vulnerability profile 240 for each of the vulnerabilities can comprise ascertaining a query-based summary 306 of a vulnerability description of the particular vulnerability on the basis of the defined query terms 305, preferably in order to filter the vulnerability description according to the query terms 305. The relevance can then be defined on the basis of the ascertained query-based summary 306, preferably on the basis of a number of the query terms 305 which occur in the vulnerability description. An output 303 of a list 304 of the vulnerabilities relevant to the product 30 can then take place. The vulnerabilities can in this case be output depending on, e.g., in the order of, their ascertained relevance in each case.

According to the embodiment variants of the present invention shown in FIGS. 2 and 3, a first step can be provided for an initialization 301. It is shown that the initialization step 301 can be carried out repeatedly in order to repeatedly ascertain by means of an update process 302 vulnerability descriptions of current vulnerabilities. During this first step 301, a large number of known vulnerabilities can be retrieved from a vulnerability specification 220, in particular from a public database such as the NVD (National Vulnerability Database), GitHub security advisories or security advisories from software providers. In this retrieval, the vulnerability descriptions are ascertained, which preferably describe the vulnerabilities in natural language. On the basis of the vulnerability description, the terms specification D can then be created in the form of a dictionary D with characteristic terms (keywords), which are used to describe the vulnerabilities in the form of security holes. This can be done automatically, e.g., using language processing such as NLP techniques such as "term frequency—inverse document frequency (TF-IDF)" and the removal of standard stop words ("and", "the", etc.), as well as standard security terms such as "attack" or "vulnerability", and the like. Alternatively or additionally, it is also possible that this takes place semi-automatically, preferably by experts who check and expand the dictionary D with terms and keywords for describing the circumstances under which a vulnerability can be exploited in practice. For example, experts can expand the dictionary D with terms from operating systems such as "network", "TCP", "IP", "root" etc. (if these terms are not already contained in D after automatic term extraction).

Optionally, the dictionary D may be expanded by vulnerabilities newly incorporated in the database, either on the basis of a particular trigger (e.g., k new entries in the database) or a time period (e.g., every 3 months). This is visualized by the update process 302.

In the embodiment variant of the present invention shown in FIG. 2, a description P, also referred to as an embedding P, can be created for the specific product 30 by using the terms from the dictionary D. In other words, a product embedding P can be defined, wherein for this purpose the terms in the terms specification D are marked with regard to their relevance for the product 30 in order to describe the product 30 by means of the marked terms, preferably by comparing the terms with a product specification 210. The product specification 210 can in this case specify the product 30 with regard to at least one software component 200 of the product 30 and/or can be retrieved from a non-volatile memory and/or a database. The product description P can be, for example, a large vector which has a "1" at any point at which the corresponding term from D is contained in the product description. In the next step, for each vulnerability found in a database such as the NVD, the textual vulnerability description can be used in order to calculate a vulnerability embedding V on the basis of the terms in the dictionary D. The embedding V can describe the vulnerability on the basis of the terms in D. A distance $l$ between P and V (for each vulnerability found in the database) can then be calculated on the basis of the two embeddings P and V. This can be done, for example, by calculating the Hamming distance between these two vectors (or another distance metric used in machine learning). The value $l$ is assigned to the vulnerability to be evaluated. Finally, a list 304 of vulnerabilities can be created which are ordered in ascending order according to their distance $l$. This list can be used to set priorities as to which vulnerabilities should be checked first. The reasoning behind this is that vulnerabilities of which the descriptions contain more keywords that are to be found in the product description are more likely to be relevant.

For the embodiment variant of the present invention shown in FIG. 3, a set of queries can be defined with the query terms 305, i.e., keywords that describe the specific product 30. The keywords used for these queries can be terms that are to be found in the dictionary D. A query-based summary 306 of the vulnerability descriptions can then be carried out for each vulnerability found in a database such as the NVD. As a result, the descriptions can be filtered on the basis of the specific queries. For each vulnerability found in the database, the result of this step can be a series of keywords and expressions S which are relevant for the queries mentioned above. Finally, a list 304 of the vulnerabilities retrieved from the vulnerability database can be created in which the vulnerabilities are ordered according to the number of keywords in the corresponding set S (optionally, the keywords can be weighted). This list 304 can be sorted in ascending order and used to set priorities as to which vulnerabilities should be checked first. The reasoning behind this is that vulnerabilities of which the descriptions contain more keywords in the results of the queries that describe the product in question are more likely to be relevant.

Exemplary embodiments of the present invention allow a plausibility check to be carried out as to whether a given vulnerability is actually relevant for the specific product 30.

In this case, the check can be carried out automatically and can concentrate on vulnerabilities in a probability-based order.

The above description of the embodiments describes the present invention exclusively in the context of examples. Of course, individual features of the embodiments, provided they make technical sense, can be freely combined with one another without departing from the scope of the present invention.

What is claimed is:

1. A method for ascertaining a relevance of security-relevant vulnerabilities of a product, comprising the following steps:
carrying out automatically:
providing a terms specification which includes terms for specifying the vulnerabilities;
providing a product profile of the product, which specifies the product based on the terms in the terms specification;
providing at least one vulnerability profile for a particular vulnerability, which specifies the particular vulnerability based on the terms in the terms specification; and
ascertaining a relevance of the particular vulnerability for the product based on a processing of the product profile and of the vulnerability profile,
wherein the providing of the terms specification includes the following steps:
ascertaining a vulnerability description of the particular vulnerability from at least one vulnerability specification; and
determining the terms in the terms specification based on the vulnerability description by a natural language processing technique, in which the terms are extracted from the vulnerability description.

2. The method according to claim 1, wherein the at least one vulnerability specification includes a public database of know vulnerabilities.

3. The method according to claim 1, wherein the vulnerability description specifies at least one attack possibility according to the vulnerability, and wherein the at least one attack possibility indicates at least one condition under which an exploitation of the particular vulnerability is possible.

4. The method according to claim 1, wherein the providing of the product profile includes the following step:
defining a product embedding, wherein for defining the product embedding, the terms in the terms specification are marked as regards their relevance for the product to describe the product by the marked terms, by comparing the terms with a product specification, wherein the product specification specifies the product with regard to at least one software component of the product.

5. The method according to claim 1, wherein the ascertaining of the relevance includes the following steps:
ascertaining a similarity of the product profile to the vulnerability profile for the particular vulnerability by calculating a distance, and/or based on processing in the form of language processing; and
defining the relevance of the particular vulnerability based on the ascertained similarity.

6. The method according to claim 1, wherein the providing of the vulnerability profile and the ascertaining of the relevance are carried out for a plurality of vulnerabilities, wherein the vulnerabilities are output based on their ascertained relevance.

7. The method according to claim 1, wherein the product is provided for controlling a machine including a vehicle and/or a robot, wherein the steps of the method are carried out automatically repeatedly, by a cloud service for monitoring information security of the product during operation of the machine.

8. A method for ascertaining a relevance of security-relevant vulnerabilities of a product, comprising the following steps:
carrying out automatically:
providing a terms specification which includes terms for specifying the vulnerabilities;
providing a product profile of the product, which specifies the product based on the terms in the terms specification;
providing at least one vulnerability profile for a particular vulnerability, which specifies the particular vulnerability based on the terms in the terms specification; and
ascertaining a relevance of the particular vulnerability for the product based on a processing of the product profile and of the vulnerability profile,
wherein the providing of the vulnerability profile includes the following steps:
ascertaining a vulnerability description of a current security-relevant vulnerability from a vulnerability specification from a public database, wherein the vulnerability description specifies at least one attack possibility according to a current vulnerability, wherein the at least one attack possibility indicates at least one condition under which an exploitation of the current vulnerability is possible; and
defining a vulnerability embedding wherein for defining the vulnerability embedding, the terms in the terms specification are marked as regards their relevance for the current vulnerability to describe the current vulnerability by the marked terms, by comparing the terms with the ascertained vulnerability description.

9. A method for ascertaining a relevance of security-relevant vulnerabilities of a product, comprising the following steps:
carrying out automatically:
providing a terms specification which includes terms for specifying the vulnerabilities;
providing a product profile of the product, which specifies the product based on the terms in the terms specification;
providing at least one vulnerability profile for a particular vulnerability, which specifies the particular vulnerability based on the terms in the terms specification; and
ascertaining a relevance of the particular vulnerability for the product based on a processing of the product profile and of the vulnerability profile,
wherein the providing of the product profile includes the following step:

defining query terms based on the terms in the terms specification, wherein the query terms specify the product;

the providing of the vulnerability profile includes the following step which is carried out for the particular vulnerability:

ascertaining a query-based summary of a vulnerability description of the particular vulnerability based on the defined query terms to filter the vulnerability description according to the query terms; and the ascertaining of the relevance includes the following step:

defining the relevance based on the ascertained query-based summary, based on a number of the query terms that occur in the vulnerability description.

10. A non-transitory computer-readable medium on which is stored a computer program including instructions for ascertaining a relevance of security-relevant vulnerabilities of a product, the instructions, when executed by a computer, causing the computer to perform the following steps:

carrying out automatically:

providing a terms specification which includes terms for specifying the vulnerabilities;

providing a product profile of the product, which specifies the product based on the terms in the terms specification;

providing at least one vulnerability profile for a particular vulnerability, which specifies the particular vulnerability based on the terms in the terms specification; and ascertaining a relevance of the particular vulnerability for the product based on a processing of the product profile and of the vulnerability profile, wherein the providing of the terms specification includes the following steps:

ascertaining a vulnerability description of the particular vulnerability from at least one vulnerability specification; and determining the terms in the terms specification based on the vulnerability description by a natural language processing technique, in which the terms are extracted from the vulnerability description.

11. A device for data processing configured to ascertain a relevance of security-relevant vulnerabilities of a product, the device configured to:

automatically:

provide a terms specification which includes terms for specifying the vulnerabilities;

provide a product profile of the product, which specifies the product based on the terms in the terms specification;

provide at least one vulnerability profile for a particular vulnerability, which specifies the particular vulnerability based on the terms in the terms specification; and ascertain a relevance of the particular vulnerability for the product based on a processing of the product profile and of the vulnerability profile, wherein the providing of the terms specification includes the following:

ascertaining a vulnerability description of the particular vulnerability from at least one vulnerability specification; and determining the terms in the terms specification based on the vulnerability description by a natural language processing technique, in which the terms are extracted from the vulnerability description.

\* \* \* \* \*